United States Patent
Pal et al.

(10) Patent No.: US 9,728,347 B2
(45) Date of Patent: Aug. 8, 2017

(54) INTEGRATED CONTACTOR MOUNTING AND POWER DISTRIBUTION SYSTEM AND METHOD

(71) Applicant: Hamilton Sundstrand Corporation, Charlotte, NC (US)

(72) Inventors: Debabrata Pal, Hoffman Estates, IL (US); John Horowy, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/572,311

(22) Filed: Dec. 16, 2014

(65) Prior Publication Data

US 2016/0172126 A1 Jun. 16, 2016

(51) Int. Cl.
| | | |
|---|---|---|
| *H01H 9/02* | (2006.01) | |
| *H01H 1/58* | (2006.01) | |
| *H01H 50/12* | (2006.01) | |
| *H01H 50/14* | (2006.01) | |
| *H02B 1/056* | (2006.01) | |

(52) U.S. Cl.
CPC .......... *H01H 1/5805* (2013.01); *H01H 50/12* (2013.01); *H01H 50/14* (2013.01); *H02B 1/056* (2013.01)

(58) Field of Classification Search
CPC .. H01R 25/006; H01R 25/164; H01R 25/162; H02G 3/00; H02G 3/128
USPC ....... 439/211, 212, 69, 70, 71, 947; 335/196
See application file for complete search history.

(56) References Cited

U.S. PATENT DOCUMENTS

| | | | | |
|---|---|---|---|---|
| 3,041,422 A | * | 6/1962 | Greshel ................. | H01H 50/30 335/125 |
| 3,627,901 A | * | 12/1971 | Happ ................. | H01L 23/49537 174/528 |
| 4,867,696 A | * | 9/1989 | Demler, Jr. ........... | H02G 5/005 174/72 B |
| 5,042,971 A | * | 8/1991 | Ambrose ................. | H01R 4/04 361/749 |
| 5,147,228 A | * | 9/1992 | Miller ................. | H01R 13/415 439/741 |
| 5,158,471 A | * | 10/1992 | Fedder ................... | H01R 9/091 439/65 |
| 5,196,987 A | * | 3/1993 | Webber ................. | H01R 25/16 361/624 |
| 5,343,365 A | | 8/1994 | Lueneburger | |

(Continued)

FOREIGN PATENT DOCUMENTS

| | | |
|---|---|---|
| DE | 8433017 | 2/1985 |
| DE | 20205637 | 8/2003 |

(Continued)

OTHER PUBLICATIONS

Extended European Search Report dated May 10, 2016 in European Application No. 15200559.1.

*Primary Examiner* — Tulsidas C Patel
*Assistant Examiner* — Peter G Leigh
(74) *Attorney, Agent, or Firm* — Snell & Wilmer, L.L.P.

(57) ABSTRACT

A contactor mounting system is disclosed herein. The contactor is directly mounted to the printed wire board. Pins may be coupled to an exposed end portion of the first stationary lead and the second stationary lead of the contactor. Pins may be configured to interconnect the contactor to the printed wire board.

10 Claims, 5 Drawing Sheets

(56) References Cited

U.S. PATENT DOCUMENTS

| | | | | |
|---|---|---|---|---|
| 5,610,800 A * | 3/1997 | Hundt | H01L 23/3107 | 257/784 |
| 5,743,004 A * | 4/1998 | Chobot | H05K 1/0201 | 228/180.1 |
| 6,179,628 B1 * | 1/2001 | Hasegawa | H01R 9/226 | 439/212 |
| 6,534,737 B1 * | 3/2003 | Rademacher | H01H 1/60 | 200/1 V |
| 6,923,661 B1 * | 8/2005 | Bogiel | H01R 23/72 | 439/78 |
| 7,629,806 B2 * | 12/2009 | Hosaka | G01R 3/00 | 324/755.06 |
| 8,092,235 B2 * | 1/2012 | Frantum, Jr. | H01R 12/724 | 439/108 |
| 8,277,265 B1 * | 10/2012 | Sykes | H01R 13/05 | 439/862 |
| 8,662,904 B2 * | 3/2014 | Tuan | H01R 13/422 | 439/79 |
| 8,901,416 B2 * | 12/2014 | Bornhorst | H04B 3/54 | 174/34 |
| 8,968,010 B2 * | 3/2015 | Endo | H01R 4/48 | 439/82 |
| 9,076,617 B2 * | 7/2015 | Yamashita | H01H 9/40 | |
| 9,245,699 B2 * | 1/2016 | Horowy | H01H 9/52 | |
| 2002/0050402 A1 * | 5/2002 | Japp | H05K 3/4641 | 174/256 |
| 2006/0128197 A1 * | 6/2006 | McGowan | H01R 9/091 | 439/212 |
| 2009/0111303 A1 * | 4/2009 | Jia | G06F 13/409 | 439/212 |
| 2013/0257569 A1 * | 10/2013 | Pal | H01H 50/043 | 335/202 |
| 2014/0002995 A1 * | 1/2014 | Pal | H01H 1/62 | 361/712 |
| 2014/0087584 A1 * | 3/2014 | Pal | H02B 1/056 | 439/485 |

FOREIGN PATENT DOCUMENTS

| | | |
|---|---|---|
| DE | 102007006923 | 8/2008 |
| EP | 2648198 | 10/2013 |

* cited by examiner

INTEGRATED CONTACTOR MOUNTING AND POWER DISTRIBUTION SYSTEM AND METHOD

FIELD

The present disclosure relates to contactor mounting systems and their components.

BACKGROUND

Contactor thermal management is a significant challenge for new generation power distribution panels. In addition, significant cost, weight and volume are design considerations of internal bus bars. Contactor mounting using posts may result in a bolted joint connect between a bus bar and post and between a contactor and the post. Bolted joint connections above 150° C. (302° Fahrenheit) are not desirable.

SUMMARY

According to various embodiments, a contactor mounting system is disclosed herein. The contactor is directly mounted to the printed wire board (PWB). Pins may be coupled to an exposed end portion of the first stationary lead and the second stationary lead of the contactor. Pins may be configured to interconnect the contactor to the printed wire board. The contactor mounting system may comprise a contactor assembly. The contactor assembly may comprise a housing. The contactor assembly may comprise a first stationary lead. The first stationary lead may at least partially extend externally from the housing. Pins may extend from the first stationary lead. The contactor mounting system may include a second stationary lead. The second stationary lead at least partially extends externally from the housing. The contactor assembly may comprise an internal mobile bus bar. The pins may be integrally formed with the first stationary lead. The pins may extend in a direction normal to a face of the first stationary lead.

According to various embodiments, the pins may be configured to mate with and couple to through holes defined by apertures in a printed wire board. The through holes are plated through holes. The printed wire board may comprise layers of copper planes. The pins are at least one of ultrasonically bonded to the first stationary lead or integrally formed with the first stationary lead. The first stationary lead is directly coupled a printed wired board via the pins.

According to various embodiments, a stationary lead assembly is disclosed herein. The stationary lead assembly may include an internal portion, an external portion and pins integrally formed in the external portion. The internal portion may be internal to a housing. The external portion may be external to a housing.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

In conventional systems, a contactor may be structurally mounted to a plate, such as a glass-reinforced epoxy laminate sheet of a woven fiberglass cloth with an epoxy resin binder (i.e., FR-4). Typically, the contactors are mounted via mounting posts, such as aluminum posts, which are coupled to a structural printed wire board. Then, bus bars are bolted to the post. Thus, the contactor is mounted to the mounting post with bolted joints. Similarly, the bus bars are connected to the mounting post by bolted joints. This results in many bolted joints. At times, a bolted joint may be loose which may cause a thermal runaway situation. Stated another way, bolted joints may become loose over time, which increases the likelihood of undesirable thermal overloads.

According to various embodiments, a contactor mounting system 100 is disclosed herein. According to various embodiments, bolted joints and mounting posts of the contactor mounting system 100 are not used or used infrequently. According to various embodiments, bolted joints and mounting posts of the contactor mounting system 100 are eliminated as compared with conventional systems. In addition, internal bus bars to connect the contactors are also eliminated as compared with conventional systems. These internal bus bars may be replaced by a printed wire board, such as a robust copper printed wire board. Printed wire board 120 may comprise one or more layers of internal copper planes. For instance, a copper printed wire board plane may be between about 2-6 mils thick, between about 1 and 10 mils thick, such as about 4.2 mils thick.

The printed wire board 120 supports and electrically interconnects to a variety of equipment, such as contactors, power interface connectors, auxiliary switches, current sensors, control interface connectors, and/or an onboard controller. The board mounted power interface connectors communicate power from a primary power distributing bus bar to respective contactors through a board mounted bus structure. The printed wire board 120 mounted contactors 105 also distribute power to other components mounted to printed wire board 120 through circuit traces formed onto the printed wire board 120.

Figure 1:
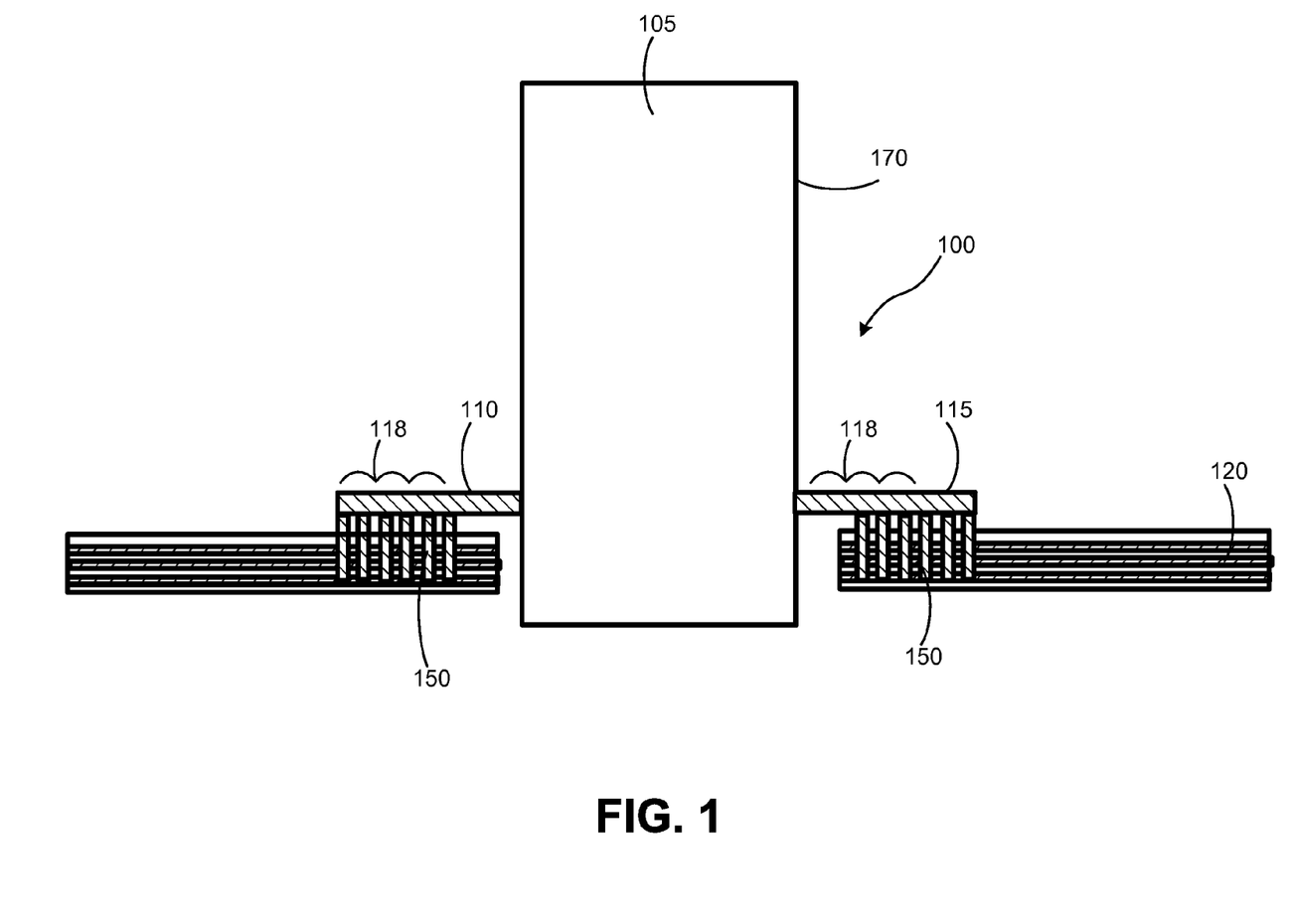
FIG. 1 depicts a cross-sectional side view of a contactor mounting system according to various embodiments.

According to various embodiments and with reference to FIG. 1, the contactor mounting system 100 tends to avoid loose bolted joints. The contactor 105 is directly mounted to the printed wire board 120. The term "directly mounted" may mean that there is no intermediary structure between the contactor 105 and the printed wire board 120. The printed wire board 120 serves a plurality of purposes. The printed wire board 120 is a structural assembly. The printed wire board 120 is also an electrical and thermal assembly. The contactor 105 may be conceptualized as a switch. The contactor 105 may comprise a motor, such as a solenoid motor, which activates a mechanical structure, to create a physical and/or electrical contact to a first stationary lead 110 and a second stationary lead 115.

Figure 2:
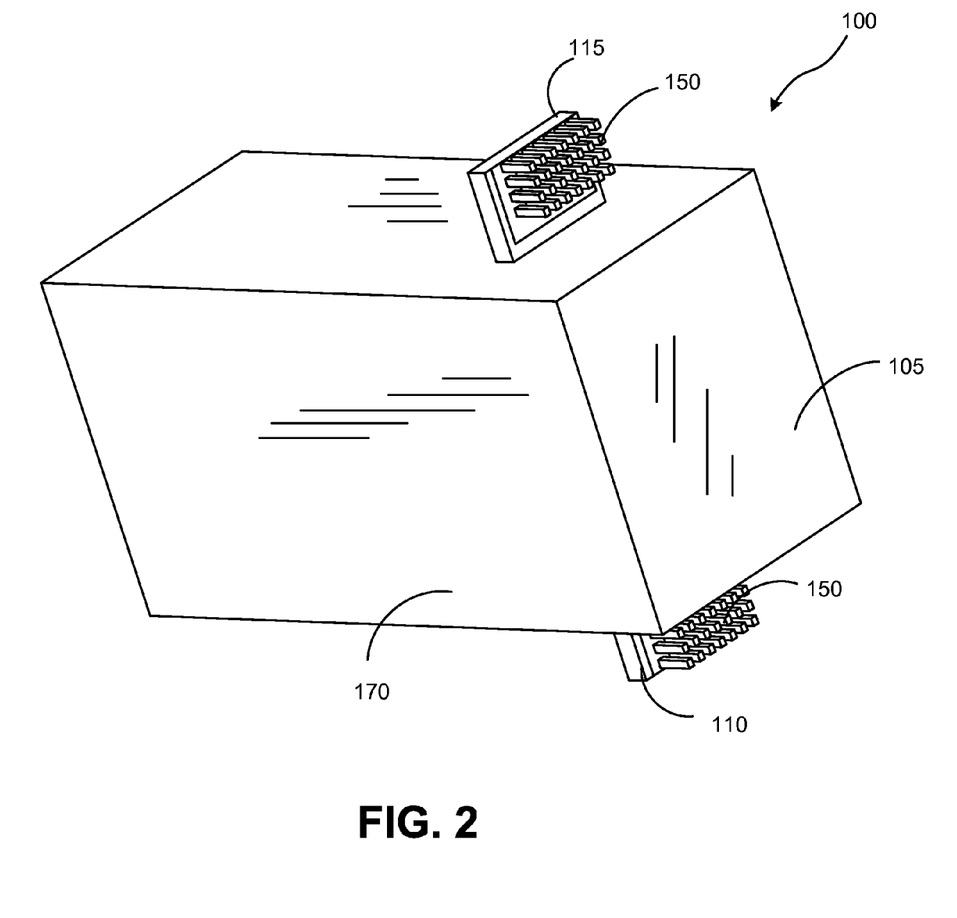
FIG. 2 depicts anisometric view of a contactor mounting system according to various embodiments.

According to various embodiments and with reference to FIGS. 1 and 2, pins 150 may be coupled to an exposed end portion 118 of the first stationary lead 110 and the second stationary lead 115. The exposed end portion may extend from a contactor housing 170. Pins 150 may be any semi-permanent and/or removable coupling mechanism configured to interconnect the contactor 105 to the printed wire board 120. Pins 150 may be formed in an array and/or matrix. The printed wire board 120 may comprise through hole 451 a plurality of through holes, such as a plurality of through holes arranged in a grid or array (with brief reference to FIG. 4). Pins 150 may be shaped and configured in a pattern to mate with through holes 451. The interaction between pin 150 and through hole 451 creates an electrical joint, placing the pin 150 in electrical communication with printed wire board 120. Moreover, the interaction between pin 150 and through hole 451 creates a structural coupling. Pins 150 fashioned integral to the contactor 105 lead, such as first stationary lead 110 and the second stationary lead 115, are press fit into through hole 451. Stated another way, pins 150 are formed as a unit with another part, such as first stationary lead 110 and the second stationary lead 115, and are press fit into through holes 451 without interfacing with a post. Thus, the contactor 105, via the first stationary lead 110 and the second stationary lead 115 may be directly mounted to a printed wire board 120 via integral pins 150.

Figure 3:
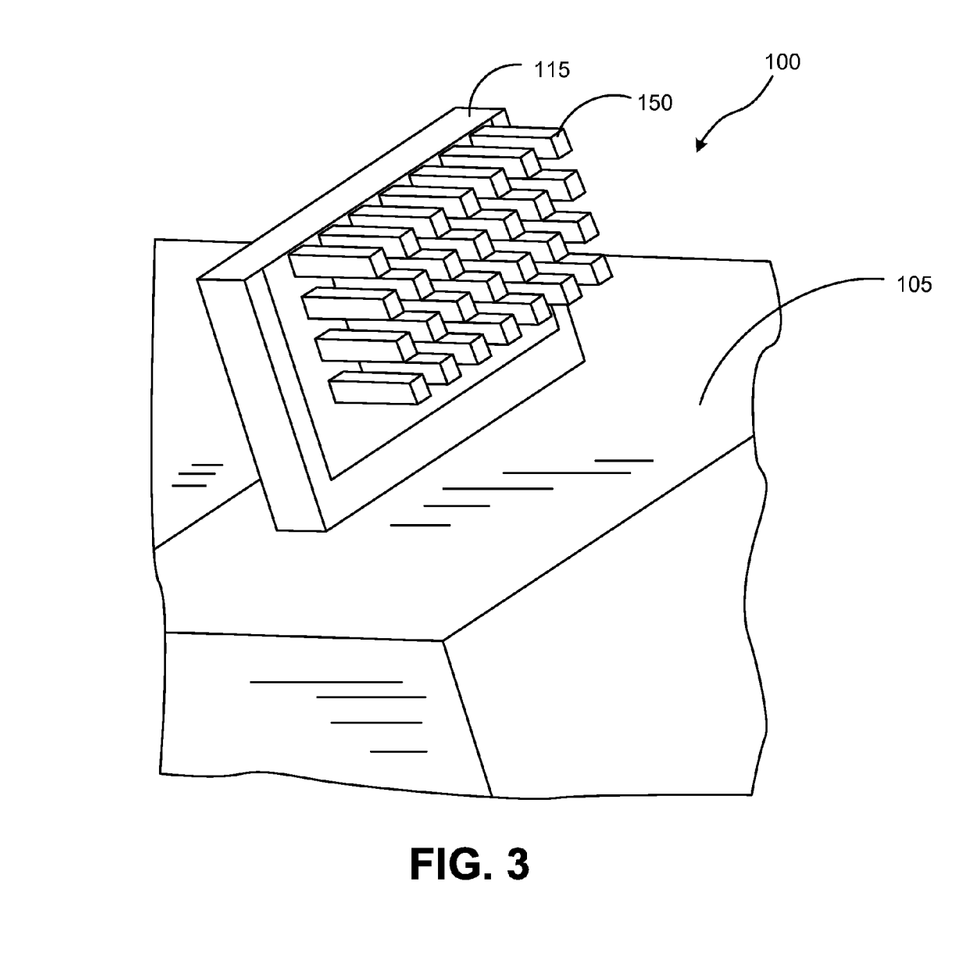
FIG. 3 depicts a contactor mounting assembly according to various embodiments.

According to various embodiments and with reference to FIG. 3, a close-up view of the second stationary lead 115 comprising pins 150 is depicted. Though pins 150 may comprise any geometry, and, as shown, pins 150 each comprise a generally square shaped cross-section. The geometry of the pins 150 may prevent movement of the contactor 105 in at least three directions with respect to the printed wire board 120. According to various embodiments, pins 150 may be compliant pins having angled edges to ease insertion into through holes 451. In this way, the contactor 105 is mounted to the printed wire board 120 via the pins 150 extending from the first stationary lead 110 and/or the second stationary lead 115.

Figure 4:
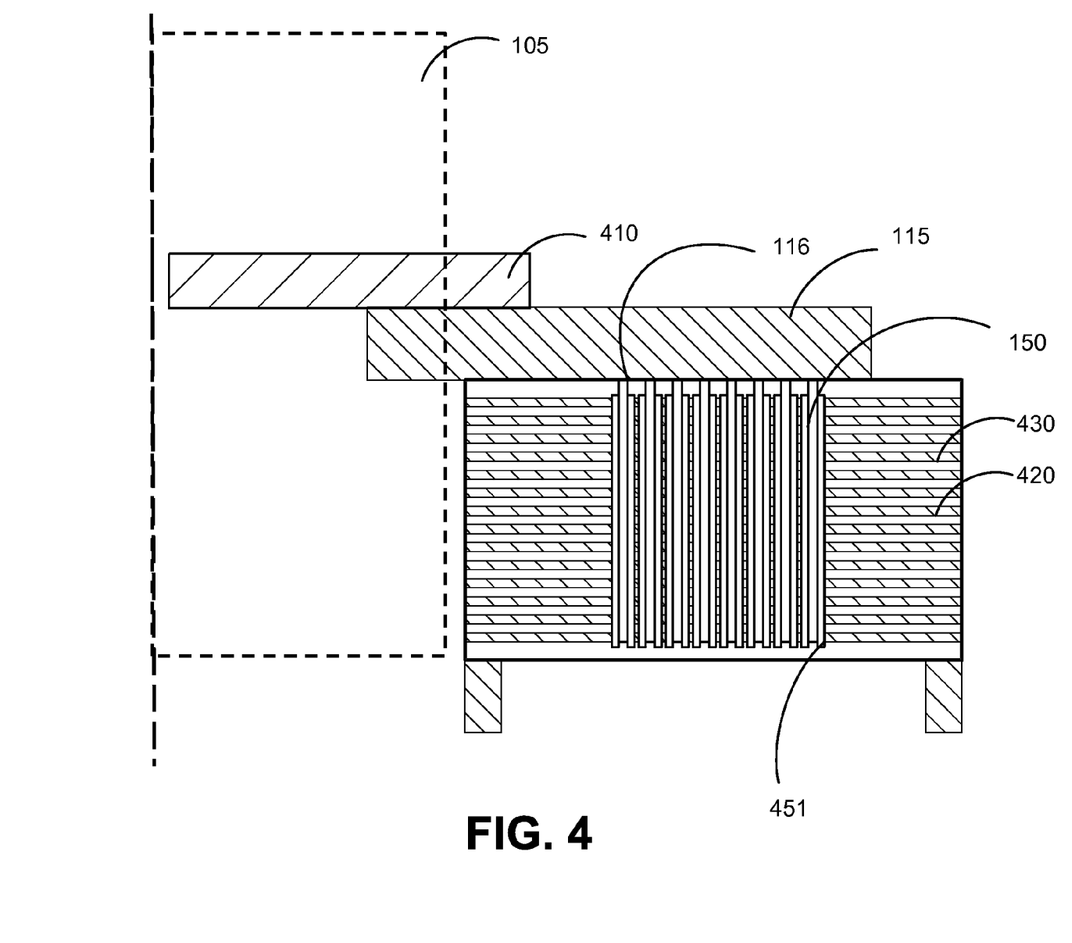
FIG. 4 depicts a side cut-away view of a contactor mounting system according to various embodiments.
Figure 5:
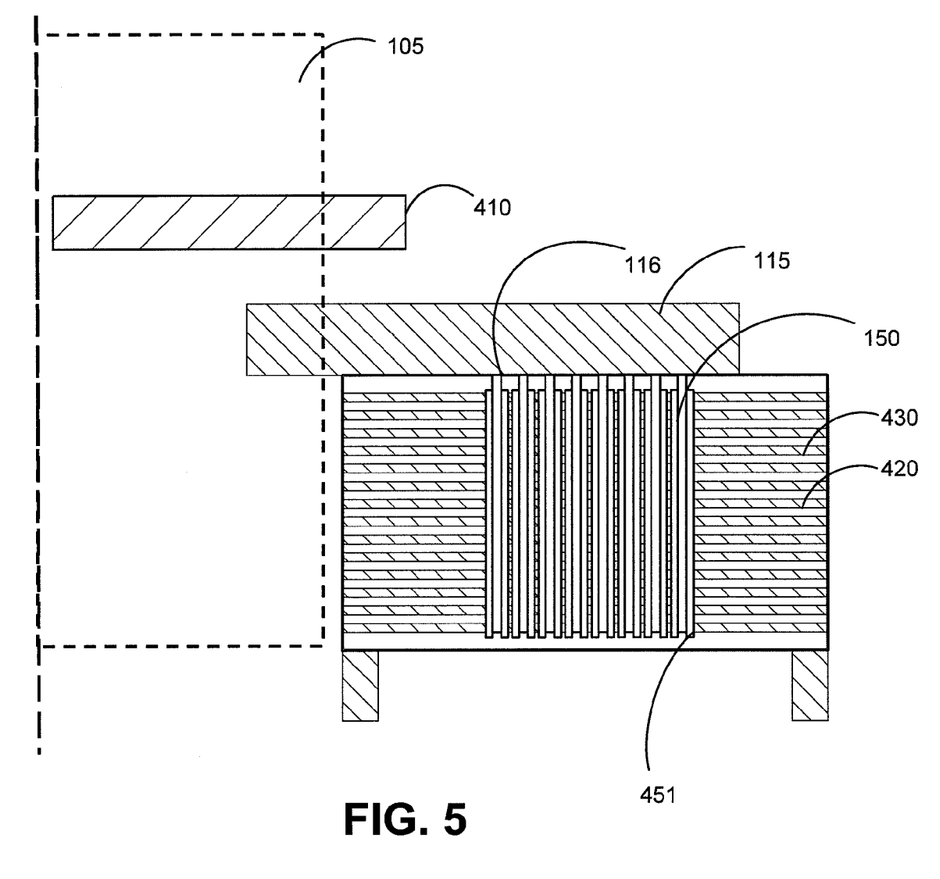
FIG. 5 depicts another side cut-away view of the contactor mounting system of FIG. 4 according to various embodiments.

According to various embodiments and with reference to FIGS. 4 and 5, an internal working of the contactor 105 is depicted. Specifically, a representation of a mobile bus bar 410 inside the contactor 105 configured to move from a first position where electrical and mechanical contact with second stationary lead 115 is restricted (as depicted in FIG. 5) to a second position where electrical and mechanical contact with second stationary lead 115 is made (as depicted in FIG. 4). Returning reference to FIG. 4, second stationary lead 115 comprises pins 150 configured to extend in a direction normal from the face 116 of second stationary lead 115. Pins 150 may be inserted into through holes 451 which are apertures in printed wire board 120 configured to receive pins 150 in a press-fit engagement. Through holes 451 may be positioned to aid in the insertion of pins 150. For instance, printed wire board 120 may comprise more through holes 451 than pins 150 to accommodate various couplings.

Pins 150 may be integrally formed in the contactor 105 lead (e.g., first stationary lead 110 and/or the second stationary lead 115) at the time the lead is formed or pins 150 may be permanently bonded to the contactor 105 lead (e.g., first stationary lead 110 and/or the second stationary lead 115) after creation of the contactor 105 lead. Pins may be ultrasonically bonded to the contactor lead or integrally formed with the contactor lead. Through holes 451 may be plated through holes (PTH). Plated through holes allow for a component to make contact with the conductive layers, such as a first conductive layer 420 and/or a second conductive layer 430 of the printed wire board 120. Plated-through holes may be referred to as vias. A via is an electrical connection between layers in a physical electronic circuit that goes through the plane of one or more adjacent layers. According to various embodiments, through holes 451 may instead comprise a blind via where the hole does not extend through the printed wire board 120 completely.

In response to the mobile bus bar 410 being in the second position (as depicted in FIG. 4, i.e., contacting a portion of the second stationary lead 115) the contactor 105 is "ON" and current may flow through the mobile bus bar 410 and the second stationary lead 115. Heat loss may occur due to the contact resistance of the joint between the mobile bus bar 410 and the second stationary lead 115. Heat may flow from the second stationary lead 115 through the pins 150 to the printed wire board 120. The printed wire board 120 may be configured to act as a mechanism to transfer heat laterally and cool the element of the contactor mounting system 100 by conduction cooling to another element, such as a heat sink and/or a cold plate. An additional heat sink may be added locally to the printed wire board 120 to dissipate a portion of the heat as desired. Printed wire board 120 may be configured for heat spreading and cooling, by natural and forced convection.

Contactor leads are modified to press fit pins to create electrical and thermal connections to printed wire board 120. No bus bar is employed for interconnecting contactors and relays. This saves weight and volume. The internal copper planes of printed wire board 120 provide a mounting structure for a contactor that also provides an electrical connection.

Traditionally, in conventional systems, a stationary bus bar is fastened to a post, the post is fastened to an external bus bar, and the external bus bar becomes the heat sink for the stationary bus bar.

According to various embodiments, the number of pins 150 of contactor mounting system 100 may be designed to accommodate a desired transfer of current, heat and the structural load. According to various embodiments, the cross-sectional size of pins 150 of contactor mounting system 100 may be designed to accommodate a desired transfer of current, heat and structural load.

Contactor mounting system 100 is more lightweight and compact as compared with conventional systems. The design of contactor mounting system 100 eliminates and/or reduces contactor mounting posts, bolts and bolted joints. This may result in cost, weight and volume savings. Internal bus bars are replaced by embedded copper planes in a printed wire board 120. The weight of bus bar is replaced by reduced weight of Cu planes in the printed wire board 120. Thus, this results in additional weight and volume savings.

While the systems described herein have been described in the context of contactor mounting systems for implementation in aircraft applications, one will appreciate in light of the present disclosure, that the systems described herein may be used in various other applications, for example, different vehicles, different power applications, or any other vehicle or device, or in connection with industrial processes, or propulsion systems, or any other system or process having need for a power supply.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A contactor mounting system comprising:
   a contactor assembly including a housing;
   a first stationary lead at least partially extending externally from the housing and having a first planar contact surface and a second surface;
   pins extending from the first stationary lead and being ultrasonically bonded to the first stationary lead or integrally formed with the first stationary lead at the time the first stationary lead is formed, the pins extending in a direction normal to the second surface of the first stationary lead, configured to mate with a printed wire board, and having angled edges and a generally square-shaped cross section to resist movement of the contactor assembly in at least three directions relative to the printed wire board; and
   a mobile busbar positioned within the contactor assembly, having a busbar planar contact surface configured to mate with the first planar contact surface of the first stationary lead, and configured to move from a first position in which electrical and mechanical contact between the mobile busbar and the first stationary lead is restricted to a second position in which electrical and mechanical contact between the mobile busbar and the first stationary lead is made.

2. The contactor mounting system according to claim 1, further comprising a second stationary lead at least partially extending externally from the housing.

3. The contactor mounting system according to claim 1, wherein a quantity of the pins and a cross-sectional size of the pins is selected to accommodate a desired transfer of current, a desired transfer of heat and a desired structural load.

4. The contactor mounting system according to claim 1, wherein the pins are configured to mate with and couple to the printed wire board via through holes of the printed wire board.

5. The contactor mounting system according to claim 4, wherein the through holes are plated through holes.

6. The contactor mounting system according to claim 4, wherein the printed wire board comprises layers of copper planes.

7. The contactor mounting system according to claim 4, wherein a quantity of the through holes is greater than a quantity of the pins to facilitate various couplings between the through holes and the pins.

8. The contactor mounting system according to claim 1, wherein the first stationary lead is coupled to the printed wired board via the pins without an intermediary structure therebetween.

9. A stationary lead assembly comprising:
   a housing having an internal portion and an external portion including a first stationary lead, the first stationary lead having a first planar contact surface and a second surface;
   a printed wire board having a plurality of through holes;
   pins ultrasonically bonded to the first stationary lead or integrally formed with the first stationary lead at the time the first stationary lead is formed, the pins extending in a direction normal to the second surface of the first stationary lead, and a quantity of the pins being less than a quantity of the through holes to facilitate various couplings between the through holes and the pins; and
   a mobile busbar positioned within the housing, having a busbar planar contact surface configured to mate with the first planar contact surface of the first stationary lead, and configured to move from a first position in which electrical communication between the mobile busbar and at least one of the pins is restricted to a second position in which electrical communication between the mobile busbar and the at least one of the pins is made.

10. The stationary lead assembly of claim 9, wherein the external portion is coupled to a printed wired board via the pins without an intermediary structure therebetween.

\* \* \* \* \*